March 15, 1966 W. L. BROWN 3,240,890

DIRECTION SIGNALING AND AUXILIARY SWITCHING APPARATUS

Original Filed Oct. 17, 1961

INVENTOR.
William L. Brown
BY
Learman, Learman & McCulloch
ATTORNEYS

United States Patent Office 3,240,890
Patented Mar. 15, 1966

1

3,240,890
DIRECTION SIGNALING AND AUXILIARY
SWITCHING APPARATUS
William L. Brown, Dearborn, Mich., assignor to Boyne
Products, Inc., Boyne City, Mich., a corporation of
Michigan
Original application Oct. 17, 1961, Ser. No. 145,639, now
Patent No. 3,120,588. Divided and this application
Nov. 27, 1963, Ser. No. 326,618
9 Claims. (Cl. 200—61.34)

This application is a division of application, Serial No. 145,639, filed October 17, 1961, now Patent No. 3,120,588.

This invention relates to direction signaling apparatus for motor vehicles, and more particularly to a direction signaling construction which is capable of performing a number of functions in addition to operating the direction signaling lamps of a vehicle.

Vehicle manufacturers currently are required by law to provide direction signaling apparatus as an integrated part of the vehicles. In the case of passenger cars, it usually is customary to provide left and right parking lamps at the front of the vehicle and left and right combination tail and stop lamps at the rear of the vehicle. Manipulation of the direction signal apparatus causes the appropriate set of front and rear lamps to flash in a well known manner so as to signal the making of a turn.

The operation of the direction signaling apparatus generally is manually initiated by the vehicle driver's actuating a lever or the like just before entering into the turn, and the signaling apparatus usually remains operative only for the length of time it takes to complete the turn. There are many instances where it would be convenient to employ auxiliary devices just prior to and during the making of a turn. For example, it would be desirable for a vehicle to have a more easily recognizable turning signal during daylight hours that may be required at night, inasmuch as the conventional flashing lamps are not as noticeable during daylight as they are at night. Moreover, it frequently would be helpful to a driver turning into an unfamiliar road or driveway at night if the area diagonally forwardly of the vehicle were illuminated. At least one vehicle manufacturer plans to include diagonally mounted turning lamps for its 1962 model vehicles, and such lamps could conveniently be operated from the direction signaling apparatus. There are many other kinds of auxiliary devices which either could be activated or deactivated upon the actuation of the direction signaling apparatus, but such devices do not themselves form any part of the invention per se.

An object of this invention is to provide direction signaling apparatus which permits vehicle manufacturers to retain their present lighting systems intact and which enables auxiliary devices to be operated concurrently with the operation of the usual signal lamps.

Another object of the invention is to provide signaling apparatus of the character described wherein both the usual direction signals and the auxiliary devices are operated by the same actuating means.

A further object of the invention is to provide apparatus of the character referred to which is selectively enabled for or disabled from operation at the will of the vehicle operator.

A further object of the invention is to provide apparatus for operating auxiliary devices of the character referred to which may be incorporated as part of conventional signaling apparatus currently in use.

Another object of the invention is to provide apparatus of the character described wherein the auxiliary devices

2 may be either active or inactive when the direction signaling apparatus is inactive.

Other objects and advantages of the invention will be pointed out in detail or will become apparent from the following description when it is considered in conjunction with the appended claims and the accompanying drawngs, wherein:

Apparatus constructed in accordance with the embodiment of FIGURES 1-5 is especially adapted for use in conjunction with direction signaling apparatus of the kind disclosed in application Serial No. 797,266, filed March 4, 1959, now Patent No. 2,999,911.

Figure 5:
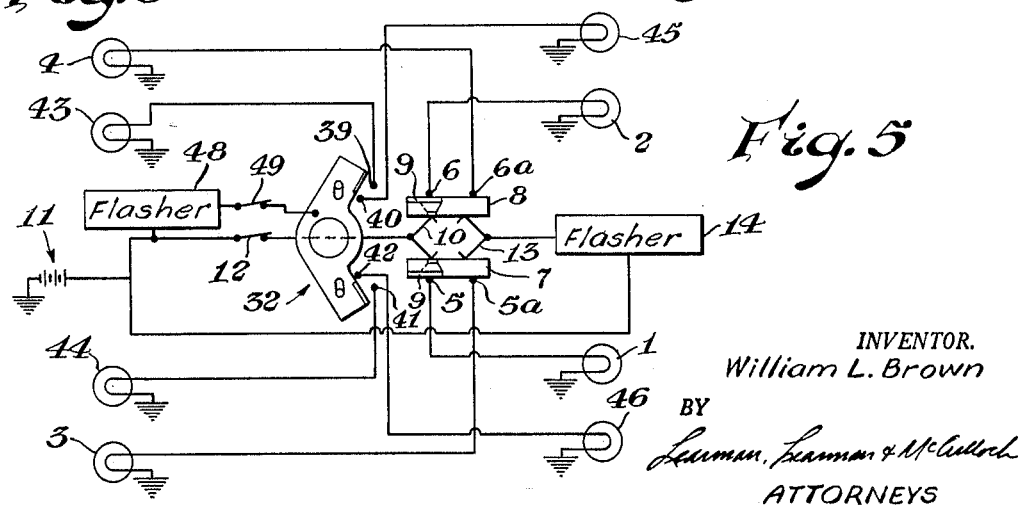
FIGURE 5 is a schematic wiring diagram illustrating the relationship between the auxiliary signaling apparatus and the signaling apparatus conventionally furnished with a motor vehicle.

Referring firstly to FIGURE 5, the conventional lighting system of a motor vehicle includes a left rear stop lamp 1, a right rear stop lamp 2, a left front parking lamp 3, and a right front parking lamp 4. The stop lamps 1 and 2 include filaments that are connected by suitable wiring to contact elements 5 and 6, respectively, which are supported in a switch casing of the kind disclosed in the aforementioned patent. The lamps 1 and 2 also may include tail light filaments (not shown) that are illuminated when the vehicle's lighting apparatus is activated.

The apparatus includes direction signaling switch means comprising a pair of movable switch blocks 7 and 8 associated with the contacts 5 and 6, and each of the switch blocks includes a conductive element 9 which normally makes contact with a bridging member 10. The member 10 is connected to a source of energy such as a battery 11 through a normally open switch 12 that is adapted to close upon application of the vehicle's brakes so as to supply energy to the stop light filaments of the lamps 1 and 2 and illuminate the latter as long as the brakes are actuated. Also associated with the switch blocks 7 and 8 are contact elements 5a and 6a, respectively, that are connected to the parking lamps 3 and 4. When the switch blocks 7 and 8 are in their neutral positions shown in FIGURE 5, the parking lamps 3 and 4 are not illuminated.

When mechanism yet to be described is actuated to effect movement of one or the other of the switch blocks 7 or 8 so as to indicate either a left or a right hand turn, the block 7, for example, will be shifted so that its conductive element 9 bridges both the contact 5 and the associated contact 5a leading to a parking lamp 3, and the contact 9 will be shifted out of engagement with the bridging device 10 into engagement with a bridging device 13 which is connected to the battery 11 through a flasher unit 14 of known construction. The relative positions of the contact block 8 and its contact 9 remain unchanged. When the parts are moved to the adjusted positions described, the left rear stop filament of the lamp 1 and the left front parking lamp 3 will flash intermittently so as to indicate a left hand turn. When it is desired to indicate a right hand turn, the block 8 is shifted in a similar manner so as to cause the right rear stop light 2 and the right front parking light 4 to flash and indicate a right hand turn.

Figure 1:
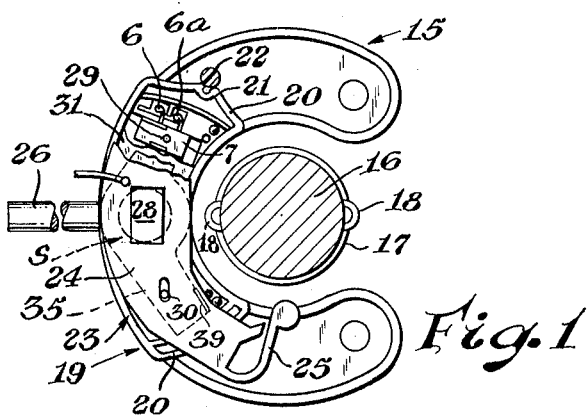
FIGURE 1 is a view partly in plan and partly in section of apparatus constructed in accordance with one embodiment of the invention, with certain parts being broken away for clarification.

Referring now to FIGURE 1, the direction signaling apparatus comprises a support 15 that may be screwed or bolted in a convenient manner to housing (not shown) which surrounds a rotatable steering shaft 16 by means of which the steerable wheels of the vehicle are turned. Fixed on the shaft 16 is a cam device 17 having one or more lobes 18 projecting substantially radially therefrom. Mounted on the support 15 in any suitable manner is a molded switch casing member 19 formed of electrically insulating material and having a hollow body adjacent the opposite ends of which are slidably mounted the switch blocks 7 and 8 in positions to engage their respective contact elements 5, 5a, 10, 13, 6, and 6a. At each end of the casing 19 is integrally formed a flexible rib 20 having a detent 21 formed therein for cooperation with detent fingers 22 integrally formed on the under surface of a molded actuating member 23 that also is formed of insulating material. The actuating member 23 includes a body portion 24 of arcuate configuration which terminates at its opposite ends in integrally formed, flexible fingers 25 which project towards the path of rotation of the cams 18, but which normally are out of the path of rotation of the cams when the actuating member is in the neutral position shown in FIGURE 1.

Means for moving the actuator member from its neutral position to an operating position on either side of the neutral position includes a handle or lever 26 that is connected at one end to a shaft 5 which passes through the casing 19 and through the actuating member 23, the shaft having a cylindrical portion 27 in the region of the casing and terminating in a rectangular portion 28 which extends through a similarly shaped opening in the actuating member 23 so as to be capable of rocking the latter upon rotation of the shaft. The actuating member is yieldably maintained in any one of its positions of adjustment by engagement of the detent fingers 22 with the detent portions formed on the yieldable ribs 20 of the casing.

On each of the switch blocks 7 and 8 is an upstanding projection 29 which is received in a correspondingly positioned socket 30 formed in the actuating member 23 so that rocking movement of the actuating member may effect back and forth sliding movement of the blocks 7 and 8. Preferably, a thin sheet 31 of fiber or other suitable insulating material is interposed between the actuating member and the electrical components contained within the switch casing. The sheet 31 has openings therein through which the projections 29 pass, such openings being large enough to permit movements of the blocks 7 and 8 without interference between the projections and the edges of the openings in the sheet.

Apparatus constructed in accordance with the invention includes an auxiliary or second switching means comprising a plate-like member 32 formed of electrically conductive material and having a central opening 33 of such size as rotatably to accommodate the cylindrical portion 27 of the operating shaft. The plate 32 also includes a pair of arms 34 and 35 which are angularly related to one another so as to conform generally to the configuration of the switch casing. The plate 32 is adapted to be received between the actuating member 23 and the insulating sheet 31 and it is provided with a pair of elongated openings 36 which receive the projections 29 on the switch blocks 7 and 8. The plate 32, when installed in the manner described, is capable of moving with the actuating member when it is rocked from its neutral position to either of its operating positions, and return, but to avoid any possibility of undue looseness between the projections 29 and the openings 36, the arms 34 and 35 include upstanding flanges 37 and 38, respectively, which are adapted to project through slots formed in the actuating member 23. One of the slots is indicated in FIGURE 1 by the reference character 39.

Figure 2:
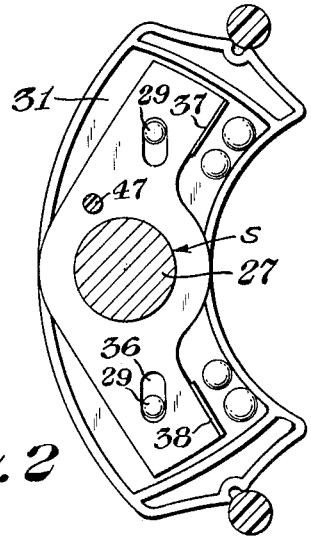
FIGURE 2 is an enlarged view, partly in section, of the switch casing member shown in FIGURE 1 with the actuating member removed and illustrating the parts in their neutral position.
Figures 3, 4, 6:
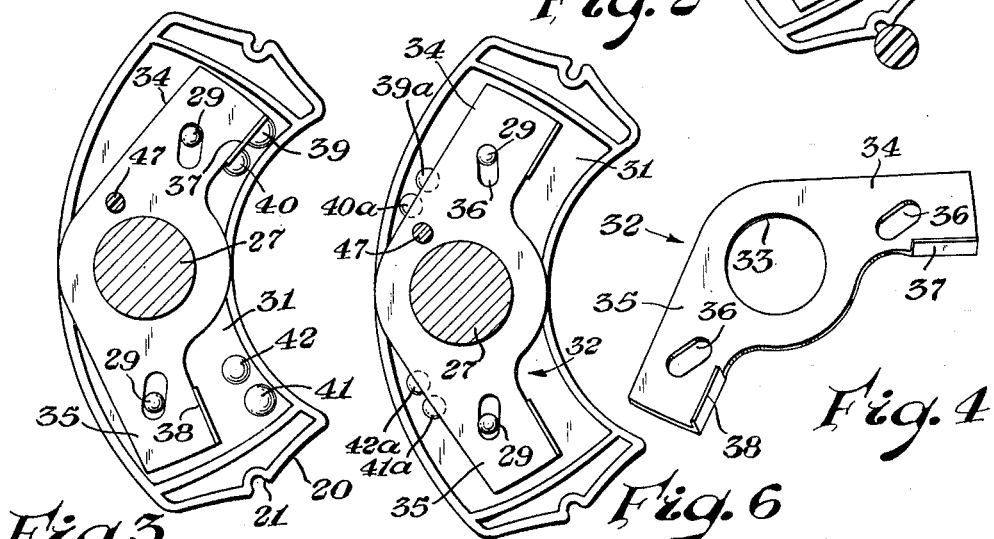
FIGURE 3 is a view similar to FIGURE 2, but illustrating parts of the apparatus in the positions they occupy when a turn is being indicated.
FIGURE 4 is an isometric view of a part of the apparatus.
FIGURE 6 is a view similar to FIGURE 2, but illustrating a modified embodiment of the invention.

When the operating lever 26 is manipulated to adjust the actuating member 23 to a right turn indicating position, for example, the switch plate 32 will be shifted from the position shown in FIGURE 2 to the position shown in FIGURE 3 so that arms 34 and 35 move clockwise. Clockwise movement of the arm 34 will cause it to engage a pair of contact means or posts 39 and 40 which are anchored in the casing 19 but which extend above the insulator sheet 31 and are electrically independent of the contact elements 6, 6a. A similar pair of contact means or posts 41 and 42 are mounted adjacent the opposite end of the casing 19 electrically independent of the contact elements 5, 5a for engagement by the arm 35 upon rocking movement of the switch plate 32 in a counterclockwise direction.

Referring again to FIGURE 5, the post 39 is connected to a lamp 43 which is mounted at the right front of the vehicle, the post 41 is connected to a similar lamp 44 that is mounted at the left front of the vehicle, the post 40 is connected to a lamp 45 mounted at the right rear of the vehicle, and the post 43 is connected to a similar lamp 46 which is mounted at the left rear of the vehicle.

The sets of lamps 43, 45 and 44, 46, respectively, are adapted to be flashed intermittently upon manipulation of the actuating member to indicate selectively a right hand or a left hand turn. To accomplish this objective, the switch plate 32 has soldered or otherwise suitably fixed thereto a contact post 47 which is supported by and extends through the actuating member 23 and is connected to the battery 11 through a flasher unit 48 and, if desired, a switch 49. As long as the switch 49 is closed, engagement of the switch arm 34 with the contacts 39 and 40 will cause the right front lamp 43 and the right rear lamp 45 to flash. Simultaneously with the shifting of the plate 32 to make contact with the contacts 39 and 40, the switch block 8 will have been shifted so as to cause flashing of the right front lamp 4 and the right rear lamp 2. There thus may be two flashing lights at the front of the vehicle and two flashing lights at the rear of the vehicle and the auxiliary lamps 43 and 45 may, if desired, be of considerably more brilliance than the conventional lamps 2 and 4.

When the actuating member is manipulated to indicate a left hand turn, the apparatus functions in the same manner, except that the two sets of lamps at the left front and left rear of the vehicle are flashed.

The switch 49 may be controlled manually so as to condition the auxiliary lamps for operation at the will of the vehicle operator. Alternatively, the switch 49 could be coupled to the switch which controls the vehicle's head lamps, so that the switch 49 will be closed when the head lamp switch is off and opened when the head lamp switch is on.

Various other modifications of the apparatus are possible. For example, the lamps 43 and 44 at the front of the vehicle may be eliminated altogether, in which event the contact posts 39 and 41 also may be eliminated. Alternatively, the lamps 43 and 44 could be angled to the left and right, respectively, to illuminate one side or the other of the road prior to turning of the vehicle. In this event the flasher 48 would be disconnected from the circuit of the lamps 43 and 44 and connected solely in the circuit of the rear lamps 45 and 46. This will cause the left or right front lamp to glow continuously as long as the turn signaling actuator member remains in its actuated position.

The embodiment shown in FIGURE 6 is the same as that shown in FIGURE 2, except that the modified construction includes two sets of contacts 39a, 40a, and 41a, 42a, mounted in the casing in such positions as to be in engagement with the arms 34 and 35, respectively, of the switch plate 32 when the latter is in its neutral position. Circuits connected by these contacts, therefore, may be closed or energized as long as the direction signaling apparatus is inactive. Upon actuation of the direction signaling apparatus to indicate a turn, however, one of the arms 34 or 35 will be rocked in a direction to be disengaged from the associated contacts 39a, 40a or 41a, 42a, thereby breaking the circuit including one pair of those contacts, but the other pair of such contacts will remain in contact with the associated arm of the plate 32. Thus, the switch plate 32 may be utilized either to make or break auxiliary circuits upon actuation of the direction signaling apparatus.

The disclosed embodiments are illustrative of presently preferred forms of the invention, but are susceptible of further modifications. This disclosure therefore is intended to be illustrative of the invention rather than definitive thereof. The invention is defined in the claims.

I claim:

1. Direction signaling apparatus comprising a casing member; a nonconductive actuating member mounted on said casing member; operating means connected to said actuating member for moving the latter relatively to said casing member from a neutral position; a plurality of contact elements supported by one of said members; switch means connected to the other of said members and operable in response to movement of said actuating member to move into and out of engagement with selected elements of said contact elements; contact means electrically independent of said contact elements and said switch means and supported by said casing member; and an electrically conductive plate member connected to said actuating member and movable therewith into and out of engagement with said contact means in response to said movement of said actuating member.

2. The apparatus set forth in claim 1 wherein said plate member has at least one flange thereon extending through an opening in said actuating member.

3. Direction signaling apparatus comprising a casing member; a nonconductive actuating member mounted on said casing member; operating means connected to said actuating member for moving the latter relatively to said casing member from a neutral position; a plurality of contact elements supported by one of said members; switch means connected to the other of said members and operable in response to movement of said actuating member to move into and out of engagement with selected elements of said contact elements; contact means electrically independent of said contact elements and said switch means and supported by said casing member; electrically conductive auxiliary switching means interposed between said members; and means interconnecting said switch means and said switching means for moving the latter into and out of engagement with said independent contact means in response to said movement of said switch means.

4. The apparatus set forth in claim 3 wherein said interconnecting means comprises a projection on said switch means received in a socket in said switching means.

5. The apparatus set forth in claim 3 including means connecting said auxiliary switching means to said actuating member for movement with the latter.

6. The apparatus set forth in claim 5 wherein said connecting means comprises a flange on said auxiliary switching means extending into an opening formed in said actuating member.

7. Direction signaling apparatus comprising a casing member; a nonconductive actuating member mounted on said casing member; operating means connected to said actuating member for moving the latter relatively to said casing member from a neutral position; a plurality of contact elements supported by one of said members; switch means connected to the other of said members and operable in response to movement of said actuating member to move into and out of engagement with selected elements of said contact elements; contact means electrically independent of said contact elements and said switch means and supported by said casing member; and electrically conductive auxiliary switching means supported by said casing member and connected to said switch means for movement in response to said movement thereof into and out of engagement with said independent contact elements.

8. Direction signaling apparatus comprising a casing member; a nonconductive actuating member mounted on said casing member; operating means connected to said actuating member for moving the latter relatively to said casing member from a neutral position; a plurality of contact elements supported by one of said members; switch means connected to the other of said members and operable in response to movement of said actuating member to move into and out of engagement with selected elements of said contact elements; contact means electrically independent of said contact elements and said switch means and supported by said casing member; and electrically conductive auxiliary switching means supported by said casing member and connected to said actuating member for movement in response to movement thereof into and out of engagement with said independent contact elements.

9. Direction signaling apparatus comprising a casing member; a nonconductive actuating member mounted on said casing member; operating means connected to said actuating member for moving the latter relatively to said casing member from a neutral position; a plurality of contact elements supported by one of said members; switch means connected to the other of said members and operable in response to movement of said actuating member to move into and out of engagement with selected elements of said contact elements; contact means electrically independent of said contact elements and said switch means and supported by said casing member; electrically conductive auxiliary switching means interposed between said members; and means connecting said switching means to said switch means and to said actuating member for movement in response to said movement thereof into and out of engagement with said independent contact means.

References Cited by the Examiner

UNITED STATES PATENTS

| | | | |
|---|---|---|---|
| 2,667,603 | 1/1954 | Hollins | 200—18 X |
| 2,841,663 | 7/1958 | Anderson | 200—18 |
| 2,948,832 | 8/1960 | Hollins | 200—61.35 X |
| 2,999,911 | 9/1961 | Dryer et al. | 200—61.34 |

ROBERT K. SCHAEFER, *Acting Primary Examiner.*

BERNARD A. GILHEANY, *Examiner.*